United States Patent
Carey et al.

(10) Patent No.: US 6,457,020 B1
(45) Date of Patent: Sep. 24, 2002

(54) QUERY OPTIMIZATION USING A MULTI-LAYERED OBJECT CACHE

(75) Inventors: Michael James Carey; Gerald George Kiernan, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,179

(22) Filed: Mar. 20, 2000

(51) Int. Cl.⁷ ............................................... G06F 17/30
(52) U.S. Cl. ............................... 707/103 R; 707/103 Y
(58) Field of Search .............................. 707/1, 2, 3, 4, 707/5, 6, 8, 10, 104.1, 103 R, 103 Y, 103, 103 Z

(56) References Cited

U.S. PATENT DOCUMENTS

| | | |
|---|---|---|
| 5,448,727 A | 9/1995 | Annevelink .................. 707/101 |
| 5,615,362 A * | 3/1997 | Jensen et al. ............ 707/103 R |
| 5,706,506 A | 1/1998 | Jensen et al. ............ 707/103 R |
| 5,812,996 A | 9/1998 | Rubin et al. ..................... 707/2 |
| 5,822,749 A | 10/1998 | Agarwal ......................... 707/2 |
| 5,920,857 A | 7/1999 | Rishe et al. ..................... 707/3 |

FOREIGN PATENT DOCUMENTS

| | | |
|---|---|---|
| WO | WO 99/14676 | 3/1999 |
| WO | WO 99/35578 | 7/1999 |

OTHER PUBLICATIONS

U.S. patent application No. 09/192,817 filed Nov. 16, 1998, entitled "Query Optimization With Deferred Updates and Autonomous Sources".

* cited by examiner

Primary Examiner—Diane D. Mizrahi
Assistant Examiner—Apu M Mofiz
(74) Attorney, Agent, or Firm—Sandra M. Parker, Esq.

(57) ABSTRACT

A method, apparatus, and article of manufacture for a computer-implemented technique for query optimization using a multi-layered object cache. An object-oriented query is executed to retrieve data from a database. The database is stored on a data storage device connected to a computer and queries are run against lower cache layers which have better performance characteristics than the external or upper layers. The multi-layered cache has an application objects (AOs) cache and a data access objects (DAOs) cache, and the application objects include methods deriving data from DAOs. The method includes a step of rewriting the query into a query directed against the DAOs cache, applying a pushdown transformation algorithm to the rewritten query directed against the DAOs cache, and executing the transformed query against the DAOs cache. The method also allows optimizing queries with path expressions by transforming path expression into joins. Another performance optimization includes using a limited data set only including the inserted and updated data, which allows the method to evaluate queries against a subset of a collection of cached objects instead of an entire collection of cached objects.

18 Claims, 4 Drawing Sheets

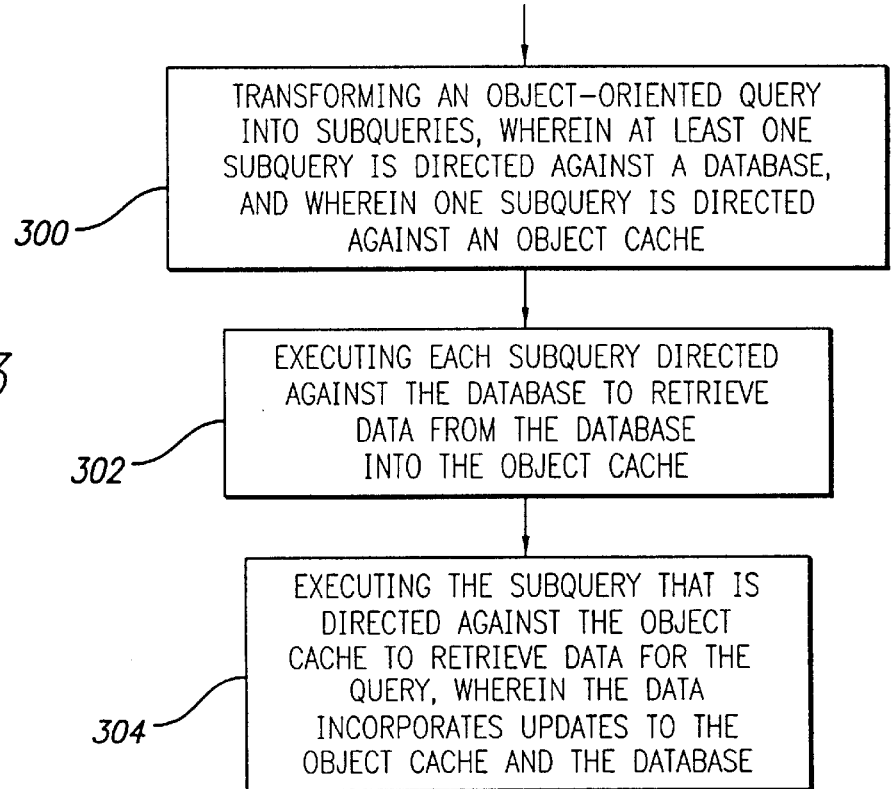
FIG. 3
PRIOR ART
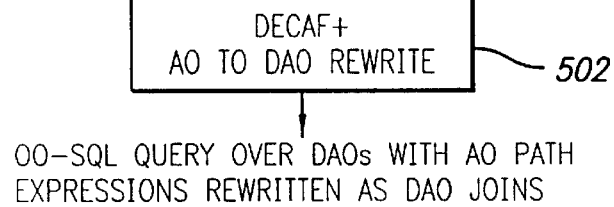
FIG. 5
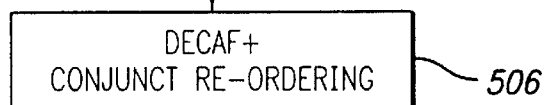

QUERY OPTIMIZATION USING A MULTI-LAYERED OBJECT CACHE

BACKGROUND OF THE INVENTION

1. Field of the Invention

This invention relates in general to computer-implemented database systems, and, in particular, to query optimization using a multi-layered object cache.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

The integration of object technology and database systems has been an active area of research for the past decade. One important aspect of the integration of these two technologies is the provision of efficient, declarative query interfaces for accessing and manipulating object data. Compared to other aspects of object-oriented database ("OODB") technology, such as integrating persistence into object-oriented languages (e.g., C++ and Smalltalk), queries were given relatively little attention in the early days of OODB research.

A number of proposals for OODB query languages have appeared in the database literature. Query rewrite transformations have been developed for relational DBMSs. Many of these transformations also apply for Object Query Systems. However, new query rewrite transformations that apply specifically to Object Query Systems need to be developed. Predicate pushdown, which is a query rewrite transformation, is the notion of taking a query and determining which parts of the query can be migrated through the layers of the schema to the databases where the data resides. The objective is to use the power of the database query function to do data filtering, and, thereby, restrict the amounts of data that have to be transferred from the database servers to clients.

Predicate pushdown can include all of the predicates that define a query's result, in which case the task of restricting the result set is entirely performed by the databases where the data resides. Predicate pushdown can include partial predicates that define a query's results, in which case some of the predicates (e.g., a subset of the conjuncts that define a query's result) are passed down to the databases where the data resides, thereby restricting the results returned by these databases. The remaining predicates that could not be pushed down are then applied in object space by the query evaluator. Finally, if redicate pushdown cannot be applied, the predicates that define a query's results must be applied in object space after having retrieved the complete sets of data referenced in the query.

Query evaluation using a client cache is presented in Shaul Dar, Michael J. Franklin, Björn T. Jónsson, Divesh Srivastava, and Michael Tan, Semantic Data Caching and Replacement, Proc. 22nd International Conference on Very Large Data Bases, Mumbai, August 1996, [hereinafter "Dar et al."]. Dar et al. focuses on determining whether a query can be resolved from the client cache alone or whether a partial query result can be obtained from the client cache with the remaining result drawn from the database server. The technique that is used for query evaluation is predicated on maintaining a semantic description of the client cache content. For a given table, the semantic description is a constraint that is dynamically modified to include new cache entries. For example, if a query initially retrieves all employees having a salary between 50,000 and 100,000, the constraint describing the cache content for the employee table is $sal \geq 50000$ and $sal \leq 100000$. If a subsequent query requests employees having a salary between 60,000 and 80,000, that query result can be drawn from the cache alone. A similar approach called predicate-based caching is presented in Arthur M. Keller and Julie Basu, A Predicate-Based Caching Scheme for Client-Server Database Architectures, The VLDB Journal, 5:35–47, 1996.

The ORION system is described in the paper entitled Architecture of the ORION Next-Generation Database System, by W. Kim, J. Garza, N. Ballou and D. Woelk, published in IEEE Transactions on Knowledge and Data Engineering, 2(1), in March 1990. In ORION, deferred updates result from altering the schema of a class, as, for example, when an attribute of a class is dropped from its schema. The task of updating all records of the class to remove the attribute from each instance is deferred until some later time. This allows schema updates to proceed quickly. ORION is an OODBMS which implements a client-server organization with support for queries that return handles on objects of a single class as query results. However, due to this restriction, ORION queries are limited to semi-joins, which are expressed as path queries (referred to as "nested class queries"). As an optimization, ORION queries can run both on the server and on the client computer. In that system updates to client resident objects which have not been propagated to the server can be reflected in query results using either a single buffer or a dual buffer evaluation scheme. Using the single buffer scheme, updates in the client cache are flushed to the server and the query is evaluated against the server.

However, this scheme is incompatible with optimistic locking, since updates can only be flushed at commit time. The dual buffer evaluation scheme runs a query against "dirty" objects in the client cache and against objects in the server. The two result sets are merged; result objects in the server's result set, which are also present in the client's result set, do not participate in the final result. This scheme is incompatible with optimistic locking. In this scheme, for example, there could have been an object O read into the cache by an earlier query within a single ongoing transaction. The object has since been updated in the database by a separate unrelated transaction. While the cache copy is "clean" and qualifies the query's result, the database copy no longer qualifies the query's result and is not returned by the server query. Since O is not "dirty", it is not selected by the client compensating query.

In the ORION system, the dual buffer evaluation scheme is also presented for path queries. The scheme involves pushing partial updates back to the server, which is incompatible with optimistic locking. Furthermore, this technique has problems with respect to duplicate semantics, if extended to full join queries. While there are buffering differences, objects are homogeneous in both the client and the server. Moreover, this system is not concerned with creating an object-oriented representation of data from heterogeneous sources, and does not support extended SQL-92 queries which can return values, as well as objects, and, aside from paths, include operations which are joins, grouping and aggregation, and union.

The Garlic system is described in the paper entitled Loading a Cache With Query Results, by Laura M. Haas, Donald Kossman and Ioana Ursu, published in Proc. 25th International Conference on Very Large Data Bases, pages 351–352, Edinburgh, in September 1999. The Garlic database middleware system supports object queries that return handles to objects as query results and allows the application of methods in queries over collections of objects. The Garlic system can return handles on objects as query results without retrieving the data associated with these objects. Retrieval is performed by a separate key-based query, issued by the application when attributes of the object are accessed. Therefore, the Garlic system allows building objects strictly by retrieving data for the key attributes and, alternatively, retrieving data for all of the object's attributes.

Moreover, Garlic has a double caching architecture to manage objects created during query evaluation and to manage objects which are returned to the application as query results. The Garlic optimizer evaluates the cost of moving cache operators to the top of a query plan or to the bottom of a query plan. Moving the cache operators to the top of the query plan minimizes the number of irrelevant cache hits (i.e., objects added to the cache which do not participate in the query's result), but incurs an additional cost of migrating all the data needed by the caching operations through the plan operators. Moving the cache operators to the bottom of the plan has inverse properties. However, the Garlic system does not yet address the problem of evaluating queries with deferred updates in the cache.

The Persistence system is described in the paper entitled Persistence Software: Bridging Object-Oriented Programming and Relational Databases, by A. Keller, R. Jensen and S. Agrawal, published in Proc. ACM-SIGMOD International Conference on Management of Data, Washington D.C., in May 1993. Persistence is an object-oriented database middleware system that supports the automated generation of C++ schemas and methods from database schemas. The C++ classes implement "get" methods, to retrieve an object into the cache based upon its key. However, it is not possible to execute queries against the object schema directly, although it is possible to execute "cache loading" queries in SQL. These SQL queries are based upon the database schema to bulk load a set of objects into the cache, instead of faulting objects into the cache from the databases, one-at-a-time, when relationships are traversed or when application objects are requested individually.

Object middleware servers use an object cache to present an object-oriented view of heterogeneous data derived from backend databases. The object cache implements object identity such that an object retrieved from the database is represented only once in the cache. Cached objects can be updated while the propagation of these updates to the backend databases can be deferred, say until the end of the transaction or at some other point in time. Queries expressed against the object model must reflect in-cache updates. The cost in performance of running these queries can be high, since the relevant data for the query results must be extracted from the backend databases into the cache and the query then executed against the cache.

Therefore, there is a need in the art to extend the previous systems in a middleware system with a less-expensive multi-layered object cache connected to a database. Furthermore, it is preferable to allow rewriting object-oriented path expressions into join clauses which can be pushed down to the underlying database, thus further optimizing query performance

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for query optimization using a multi-layered object cache.

In accordance with the present invention, a method, apparatus, and article of manufacture for a computer-implemented technique for query optimization using a multi-layered object cache is presented. An object-oriented query is executed to retrieve data from a database. The database is stored on a data storage device connected to a computer and queries are run against lower cache layers which have better performance characteristics than the external or upper layers.

The multi-layered cache has an application objects (AOs) cache and a data access objects (DAOs) cache, and the application objects include methods deriving data from DAOs. The method includes a step of rewriting the query into a query directed against the DAOs cache, applying a pushdown transformation algorithm to the rewritten query directed against the DAOs cache, and executing the transformed query against the DAOs cache.

The method also allows optimizing queries with path expressions by transforming path expression into joins. Another performance optimization includes using a limited data set, only including the inserted and updated data, which allows the method to evaluate queries against a subset of a collection of cached objects instead of an entire collection of cached objects.

BRIEF DESCRIPTION OF THE DRAWINGS

Referring now to the drawings in which like reference numbers represent corresponding parts throughout:

FIG. 3 is a flow diagram illustrating the basic steps performed by the DECAF optimization (prior art);

FIG. 5 is a flow diagram illustrating the basic steps performed by the DECAF+ query optimization that may be used in accordance with a preferred embodiment of the present invention.

DETAILED DESCRIPTION OF THE PREFERRED EMBODIMENT

Figure 1:
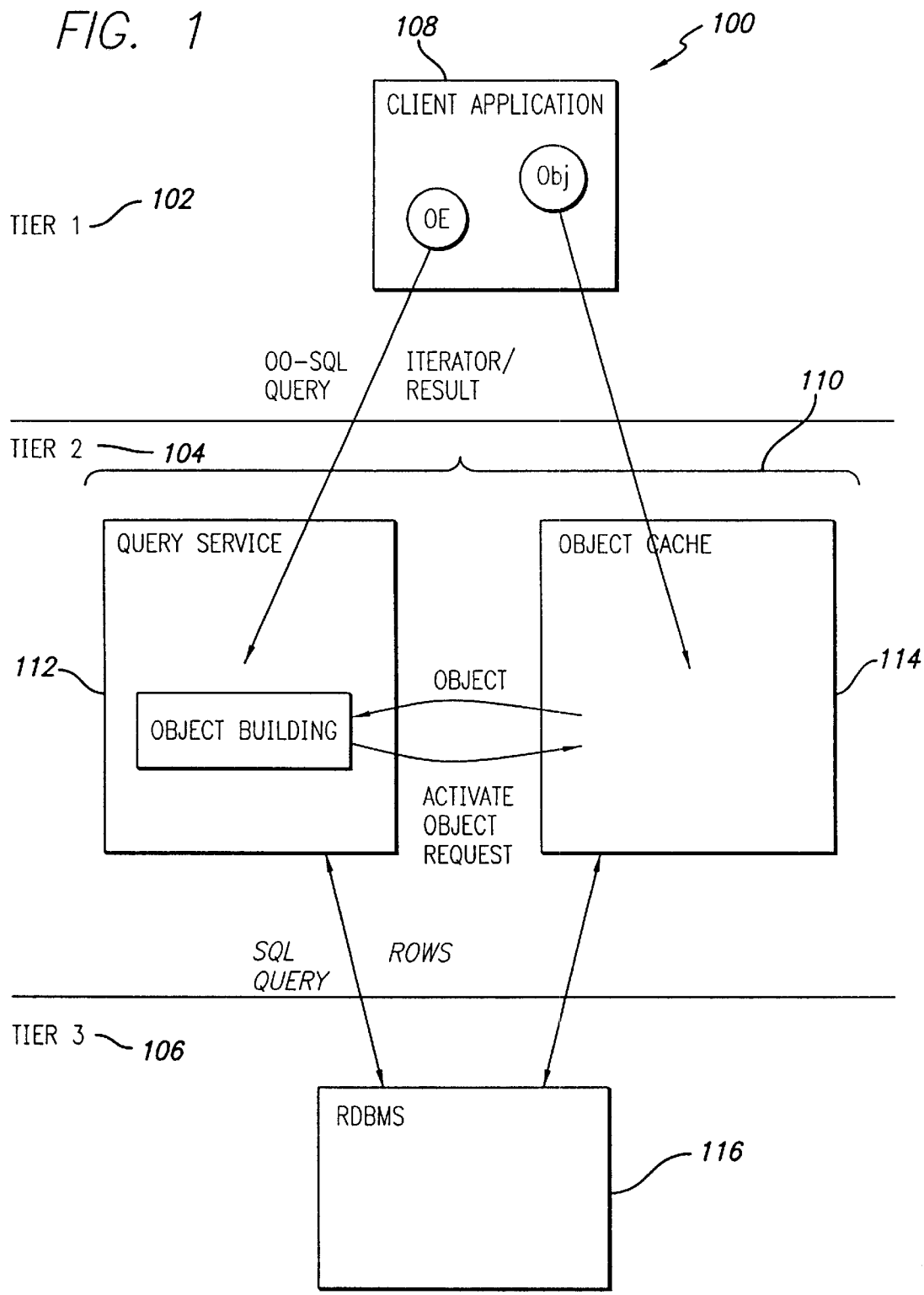
FIG. 1 is a diagram illustrating a three tier run-time environment that may be used for the present invention in accordance with a preferred embodiment.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

The present invention describes a query optimization technique for an object middleware query service that provides an object view of heterogeneous data using a multi-layered object cache, referred herein as DECAF+. The invention is an extension of the previous invention by the same inventors called DECAF and exploits the fact that an object cache can be organized into multiple levels or layers. It further extends the query optimization by exploiting the multi-layered cache organization for evaluating predicates against the lower, more efficient layers of the cache. DECAF, also used in the present invention, is described in detail in the US patent application entitled Query Optimization With Deferred Updates and Autonomous Sources, filed by the same assignee on Nov. 16, 1998, under the Ser. No. 09/192,817 now U.S. Pat. No. 6,285,997, which is incorporated by reference herein.

The query service in Component Broker (CB) of our object middleware system uses object views to describe and implement the mappings between data from heterogeneous sources and object data represented in the middleware. Since the mapping is not opaque to the query engine, query optimization techniques can be applied by the query service to optimize and push down query operations to the underlying data sources to exploit their query processing capabilities. This is especially useful for relational DBMSs which have powerful query processing engines. The invention extends the DECAF system which focused on providing consistent query results when updates in the middleware cache are not immediately propagated to the underlying data sources. If deferred updates are present in the memory, query push-down alone can render inconsistent results since the database will not reflect the middleware's "in-cache" deferred updates. In the presence of deferred updates, the DECAF algorithm concentrated on extracting the minimum amount of data from the data sources into the middleware object cache and then running the query against the object cache.

The DECAF+ system presented in this disclosure supports the fact that running queries against objects in the middleware cache can be costly in terms of performance. A multi-layered approach for object views is a useful mechanism for managing and propagating updates from derived objects. Therefore, a middleware cache of the present invention is a multi-layered cache representing both application objects and the lower level structures from which these objects are derived. The top layer contains application (business) objects (AOs), which are application objects having both the attributes and methods required by the application domain. The business objects derive their attributes (or data) from the data access objects (DAOs), which represent, for example, cached rows from a relational database.

The present invention exploits the fact that DAOs are lighter-weight objects than business objects and thus evaluating predicates against DAOs is less costly than evaluating equivalent predicates on business object attributes implemented as methods. Furthermore, the cost of evaluating queries against the cache increases as the cache grows. Therefore, another performance enhancement of the present invention, for each collection participating in a query, allows use of the set of newly inserted or updated objects in the cache, as opposed to the full in-cache set of objects, and thus avoids a performance penalty as the set of cached objects grows during the course of a transaction. Another important performance advantage of DECAF+ over DECAF is that DECAF+ can decompose path expressions into joins and further optimize a query by pushing down more predicates to the underlying database. DECAF cannot rewrite path expressions, so, predicates involving path expressions needed to be evaluated in the cache. Since some object view systems use multi-layered caching for derived objects, the invention presented in this disclosure can be generalized to those and similar systems.

While relational database queries range over tables, object queries range over collections which are aggregate structures that store or reference zero or more objects. In the DECAF+ system, the particular variant of collection structure that is used is called "home collection". In DECAF, cache iterators are over collections of business (application) objects (BOs or AOs), and the foreign key attributes required to convert paths into joins do not appear in the AOs' signatures.

1. DECAF System Overview

The DECAF optimization presents a query optimization technique to provide consistent answers to queries over object views using an object cache with deferred updates.

RDBMSs exploit a client-server run-time model in which a query and a query result (i.e., in the form of rows) are the main elements of the protocol between the client application and the database server. While results are returned to the application, caching (i.e., buffering) is performed on the server and new results are computed at the server, disregarding any previous result that the client application might have received Object-oriented DBMSs ("OODBMSs") also use a client-server run-time model. In contrast with RDBMSs, OODBMSs generally perform their work, including query evaluation, on the client cache. In some OODBMSs, the server is merely a page server that responds to page requests from the client cache. In other OODBMSs, the server is an object server, sending individual objects or logical groups of objects to the client.

The DECAF optimization has query capabilities that present an object-oriented view of data managed by DBMSs. The object-oriented view is maintained with an object cache of data retrieved from DBMSs. The object cache contains a subset of the DBMS data and corresponds to data being manipulated by client applications. The object cache can also contain updates that need not necessarily be immediately propagated back to their target DBMSs. For example, for efficiency reasons, updates from the object cache to the target DBMSs may not be performed until the client issues a transaction commit. Object queries are expressed against object views maintained by the object cache. Query rewrite optimizations are used to transform queries expressed against the object model into equivalent queries expressed against target databases, thereby utilizing the query capabilities of these systems and limiting the amount of data transferred between the database server and the object cache. However, client query results need to be consistent with the target databases and with the deferred updates present in the object cache.

The techniques used to resolve views in relational DBMSs have been extended and adapted to object views. Query rewrite techniques are used to resolve object queries over views which can have multi-valued view columns, instance view columns, and path expressions that traverse view columns. To preserve the distinction between classes and collections that is found in many OODBMSs and Object-Oriented Systems ("OOSs"), the notion of view type is introduced. A single view type can be used for multiple views, multi-valued view columns, and/or instance view columns, which is further discussed in Kiernan et al. In particular, a collection refers to a collection of objects. An object is instantiated from a class.

Object-oriented DBMSs offer a seamless integration of application types and database types. In contrast with queries over relational databases, which return values that correspond to attributes in the rows of tables, queries over object-oriented databases can return handles to application objects as query results. Returning handles on application objects is a problem for queries over views. Views are understood by the query engine, but usually have no representation as application types. The problem of rendering application objects from views and view types is referred to as object building. Object building is further described in A System, Method, and Program for Object Building in Queries over Object Views, U.S. patent application Ser. No. 08/853,976, filed on May 9, 1997, now U.S. Pat. No. 6,122,627 by Gerald G. Kiernan, et al., which is incorporated by reference herein. Object building is performed under the control of the query engine during query evaluation. There are two classes of queries that are affected by object building: 1) queries that return view types as query results and 2) queries that invoke methods on view types.

An object cache is used to preserve the object-oriented notion of identity, which states that two objects are the same if they have the same internal identifier. For example, in C++, memory location determines identity (i.e., an object is uniquely identified by its location in the memory). Some OODBs (e.g., O2, which is described in O. Deux et al., The Story of O2, IEEE Transactions on Knowledge and Data Engineering, 2(1), March 1990 and which is incorporated by reference herein) use an Object Identifier (OID) to maintain unique references to objects. The OID can either be a logical identifier independent of storage location or a physical identifier pointing to some storage area.

For the DECAF optimization, objects are retrieved from the underlying databases and added to the object cache. A key is used to determine whether an object is already resident in the object cache. A key is derived from one or more members of a type. If the object is found in the object cache, the cached copy of the object is used. If the object is not found in the object cache, a cached copy is created and added to the cache. Thereafter, the object's internal identifier (e.g., cache address) can be used by the client application to reference the object.

2. DECAF Environment

This section provides a brief overview of an environment in which the DECAF optimization of the present invention may be used. Since a focus of the DECAF optimization is directed to objects of view types that are based upon relational tables or other database structures, this section also reviews object views and view types.

2.1 Run-Time Caching Environment

FIG. 1 is a diagram illustrating a three tier run-time environment that may be used for the present invention in accordance with a preferred embodiment. Three tier environments arose from the more common two tier, or client-server, environments. In FIG. 1, the three tiers 102, 104, and 106 may be separate systems connected by a network. In the alternative, the three tiers 102, 104, and 106 may reside on one system. Similarly, the system could be equally adapted to a two tier environment in which the first and the second tier are combined.

In the three tier environment, what was referred to as the "client" in a two tier environment is essentially divided into two tiers: the client application 108 contained on tier 1 102 and the business object server 110, which contains the business logic common to several client applications, on tier 2 104. Tier 3 contains the backend database server 116, for example, a RDBMS.

The focus of tier 2 104 is to present the data contained at tier 3 106 as business objects, which are best suited for the needs of applications, thereby factoring out a percentage of the business logic that would otherwise be replicated across client applications. The business object server 110 comprises a query service 112 for handling queries from the client application 108 and an object cache 114 for storing a portion of data retrieved from the RDBMS 116. The data in the object cache 114 can be modified directly in the object cache 114.

In particular, the client application 108 at tier 1 102 obtains a handle on a query evaluator ("QE"), which can then be used to submit queries to and retrieve query results from the business object server 110 at tier 2 104. Query results that are references to objects are managed by the tier 2 104 object cache 114. The client application 108 can also get a handle to an object and operate on the object (e.g., with C++ methods) or obtain values of the objects (e.g., names of employees maintained in an employee object).

The following discussion focuses on two transaction environments: a Serializable Repeatable Read environment and an Optimistic Locking with Read-Committed environment.

In a serializable repeatable read environment, when a transaction requires data from the RDBMS 116 to be retrieved into an object cache 114, the transaction maintains a lock on the RDBMS 116 for the data retrieved for the duration of the transaction. That is, other transactions are prevented from accessing the data used by the RDBMS 114 until the transaction commits. Therefore, when a client transaction on tier 1 102 has a private cache in the object cache 114 on tier 2 104 that contains objects that have been retrieved from a tier 3 106 database 116 on its behalf, the cached objects on tier 2 104 that have been retrieved since the transaction began are consistent with the database 116 on tier 3 106 for the duration of the transaction.

There is a one-to-one correspondence between a client transaction managed by tier 2 104 and the corresponding database transaction managed by tier 3 106. The tier 2 104 object cache 114 can defer updates to the tier 3 106 RDBMS 114 until the end of a transaction. Furthermore, the contents of the object cache 114 on tier 2 104 may or may not be retained beyond the end of a transaction.

In an optimistic locking with read-committed environment, a transaction does not hold a lock on the RDBMS 116 while reading data from the RDBMS 116. Therefore, possible updates made to the RDBMS 116 during the course of the transaction are determined while updating the RDBMS 116. Additionally, the original data retrieved from the RDBMS 116 is maintained, and the original data is compared to the RDBMS 116 data when the transaction is ready to write updates to the RDBMS 116. In this manner, any modifications that occurred to the RDBMS 116 during the course of the transaction are identified.

The tier 2 104 object cache 114 is shared among the N client applications that are using the business object server 110. The business object server 110 on tier 2 104 maintains a level of isolation based upon serializable repeatable reads among its client transactions.

The level of isolation kept between the tier 2 104 business object server 110 and the tier 3 106 RDBMS 116 is read-committed. That is, only committed updates will be retrieved from tier 3 106 into the object cache 114. Updates made to the object cache 114 are deferred until the end of the client transaction. The transaction will abort if an updated object in the cache has changed in the tier 3 106 database 116 since the object was last read into the tier 2 104 object cache 114. For example, if an employee E's salary was 10,000 when it was read into the object cache 114 but is found to be 12,000 when the deferred update transaction runs, the transaction is aborted and updates are not made.

Objects that are retrieved into the object cache 114 from tier 3 104 after the client transaction began are not refreshed until the client transaction ends. That is, if the same object is retrieved twice during the course of a client transaction with different values, the initial values are maintained. Cached objects encountered by a client transaction, e.g., during query processing, must be refreshed by values obtained through a tier 3 106 retrieval if a cached object copy is older than the start of the client transaction.

The query service 112 is briefly described here, and it will be described in greater detail in the Section 2.2. The query service 112 accepts queries over collections of objects. These collections can be of view types, derived from tables contained in databases managed at tier 3 106. Queries that return handles on objects or invoke methods on objects require processing called "object building" during query evaluation. That is, the query evaluator calls caching functions with the necessary data to activate or create (i.e., "build") cached copies of objects in the memory. Once found or created, the object is returned to the query evaluator for further processing. If the object is part of the query's result, the object is also returned to the client application 108 on tier 1 102. If the object cache 114 contains deferred updates, query evaluation must also take these updates into consideration in computing the query's result.

In the exemplary three tier environment, each tier may comprise, inter alia, one or more processors connected to one or more data storage devices, such as a fixed or hard disk drive, a floppy disk drive, a CDROM drive, a tape drive, or other device.

Operators of the three tier environment 100 may use a standard operator interface, such as IMS/DB/DC®, CICS®, TSO®, OS/390®, ODBC® or other similar interface, to transmit electrical signals to and from the client application 108 that represent commands for performing various search and retrieval functions, termed queries, against the databases 116. In the present invention, these queries conform to the Structured Query Language (SQL) standard, and invoke functions performed by Relational DataBase Management System (RDBMS) software 116.

SQL has evolved into a standard language for RDBMS software and has been adopted as such by both the American National Standards Institute (ANSI) and the International Standards Organization (ISO). SQL allows users to formulate relational operations on tables either interactively, in batch files, or embedded in host languages, such as C and COBOL. SQL allows the user to manipulate data. Those skilled in the art will recognize, however, that the present invention is applicable to any database software, whether or not the database software uses SQL.

Generally, the client application, business object server, RDBMS software, and the instructions derived therefrom, are all tangibly embodied in a computer-readable medium, e.g. one or more of the data storage devices. Moreover, the client application, business object server, RDBMS software, and the instructions derived therefrom, are all comprised of instructions which, when read and executed by the three tier environment 100 causes the three tier environment to perform the steps necessary to implement and/or use the present invention. Under control of one or more operating systems, the client application, business object server, RDBMS software, and the instructions derived therefrom, may be loaded from the data storage devices into a memory of the computer system for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

2.2 Object Query Service

Figure 2:
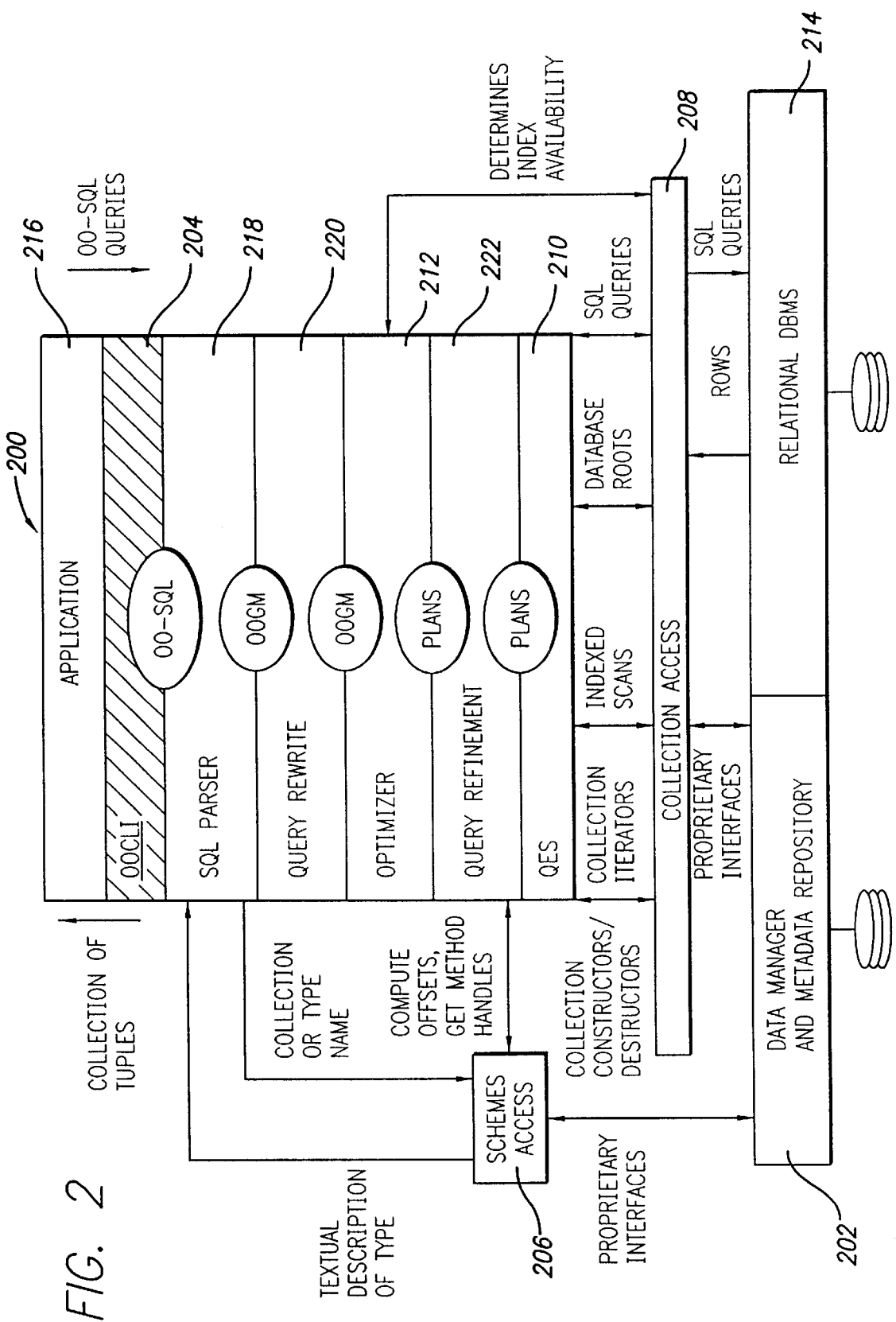
FIG. 2 illustrates an object oriented-SQL ("OO-SQL") query engine that may be used in accordance with a preferred embodiment of the present invention.

FIG. 2 illustrates an object oriented-SQL ("OO-SQL") query engine 200 that may be used in accordance with a preferred embodiment of the present invention. The OO-SQL query engine is based upon the design of the Starburst relational DBMS, which is described in L. M. Haas, W. Chang, G. M. Lohman, J. McPherson, P. F. Wilms, G. Lapis, B. Lindsay, H. Pirahesh, M. Carey, and E. Shekita, Starburst Mid-Flight: As the Dust Clears, IEEE Transactions on Knowledge and Data Engineering, pages 143–160, March 1990, which is incorporated by reference herein. The object oriented DBMSs or object oriented systems over which the query engine runs act as the data manager 202.

The components that are involved with portability are: the Object-Oriented Call Level Interface (OOCLI) 204, the Schema Access component 206, and the Collection Access component 208. The OOCLI 204 is an application programmer interface (API) that accepts queries and returns results in the form of collections of tuples or objects.

The Schema Access component 206 is called during query compilation to describe the schemas of objects contained in the collections that are referenced in queries. The schemas of types of intermediate nodes referenced in path expressions are also obtained through this interface. Collections that are views are interrogated during query compilation to extract the view definitions that implement them. These definitions are parsed and included in the query graph (internal representation) of the query. The textual representation of schemata simplifies the management of schema information for views. During query refinement, path expressions are traversed to establish the data access methods used to retrieve the data. If, for example, offsets are used, then path expression nodes are assigned the necessary offsets to retrieve the data members that they represent. If methods are used, then method handles are obtained for each method node in the path expression. The meta data interfaces describe local and inherited members (i.e., the schema information retrieved for a given type contains both local and inherited members).

The Collection Access component's 208 role during query optimization is to document the availability of indexes. Its major tasks are performed later, during query execution, under the control of the Query Evaluation Subsystem (QES) 210. Collections that store temporary or intermediate results are created and dropped during query evaluation. Sequential scans are performed by creating and opening iterators (or cursors) that scan through a collection of objects. Indexed scans, if available, are executed by setting lower and upper bounds.

Collections of row types can be formed from relational tables. These collections and types can participate in the definition of views and view types thereby creating object views of relational database tables. The Schema Access Component 206 indicates the type of backing store for each collection. This information is used by the Optimizer 212 during query optimization for query plan generation. If tables participate in a query, the Optimizer 212 decides whether a query can be resolved by one or more relational queries. If a query can be resolved by one or more relational queries, the Optimizer 212 generates these relational queries as part of the object query plan. Such queries are then submitted the Relational DBMS 214 during query evaluation.

Typically, an Application 216 submits an object-oriented SQL query to retrieve data from the Relational DBMS 214. The OOCLI 204 accepts the query. The SQL Parser 218 parses the query. During parsing, the SQL Parser 218 provides collection or type name information to the Schema Access Component 206 and obtains a textual description of a type from the Schema Access Component 206. The SQL Parser 218 generates and forwards an object query graph model ("OQGM"), which is a structure that represents a parsed query. The Query Rewrite Component 220 receives and modifies the OQGM, and forwards the modified OQGM to the Optimizer 212. The Optimizer 212 optimizes the query and generates a plan. The Optimizer 212 works with the Collection Access Component 208 to determine index availability when generating the plan. The Optimizer 212 forwards the plan to the Query Refinement Component 222. The Query Refinement Component 222 works with the Schemas Access Component 206 to compute offsets and get method handles for methods used to refine the plan. Then, the Query Refinement Component 222 refines the plan and forwards the plan to the QES 210. The QES 210 performs processing, including transmitting the SQL query to the Collection Access Component 208, which retrieves data from the Relational DBMS 214. The retrieved data is then returned to the Application 216, in the form of, for example, a collection of tuples.

The DECAF optimization may reside in one or more components of the object oriented-SQL ("OO-SQL") query engine 200. In a preferred embodiment, for example, the DECAF optimization may reside as part of the Optimizer 212 and as part of the Query Rewrite Component 220.

Kiernan et al. provides a detailed description of all the query processing components of the system.

2.3 Overview of Object Views

This section briefly introduces row types, object view types, and object views.

2.3.1 Relational Row Types

In the DECAF optimization, one objective is to provide object views of heterogeneous data, including relational tables. In order to achieve this, there is a need to distinguish between types and collections of element types. If tables are to be used as parameters to OODB view types, each table's elements must have an associated type similar to other collections in the system. Examples of such row types for relational tables follow.

```
row type db2depttable (dno integer,
    dname varchar,
    dfloor integer,
    primary key (dno))
row type db2emptable(eno integer,
    ename varchar,
    esal double precision,
    eage integer,
    edid integer not null,
    primary key (eno),
    foreign key (edid) references db2depttable (dno))
```

In the first example above, a row type named "db2depttable" is defined as having four columns and a primary key. The four columns are "dno", which is an integer representing a department number, "dname", which is a variable length character string representing a department name, "dfloor", which is an integer representing a department floor, and "budget", which is an integer representing a department budget. The primary key is "dno".

In the second example above, a row type named "db2emptable" is defined as having seven columns, a primary key, and a foreign key. The seven columns are "eno", which is an integer representing an employee number, "ename", which is a variable length character string representing an employee name, "esal", which is a double precision number representing an employee's salary, "eage", which is an integer representing an employee's age, "edid", which is an integer representing an employee's department identifier. Additionally, the primary key is "eno", and the foreign key "edid" corresponds to the "eno" column of a row type "db2depttable".

Once a row type has been defined, the row type can be referenced in an alias definition. The alias definition associates a collection name and an underlying element type (row type) with a named relational table. Thus, aliases define a set of relational tables, and the alias names can then appear in OO-SQL queries or definitions of view types. The following are examples of aliases for relational tables:

```
alias db2dept for db2depttable (db1.kiernan.dept)
alias db2emp for db2emptable (db1.kiernan.emp)
```

The alias "db2dept" is an alternative name for a table "db1.kiernan.dept", which is of row type "db2depttable". The alias "db2emp" is an alternative name for a table "db1.kiernan.emp", which is of row type "db2empttable".

2.3.2 View Types

For illustration, view types are defined below that have an identical schema to the row types presented above. In real applications, these views would define attributes that are references, nested sets (which are described in Kiernan et al.), and expressions (e.g., salary*1.1). However, these features are not necessary to demonstrate the DECAF optimization, and so they do not appear in the examples.

The OO-SQL view types represent object types with attributes, and possibly methods, in contrast to tabular rows with columns. View types accept parameters that identify the types of source collections from which view types are derived. Aside from being parameterized, the view types are similar to views found in commercial relational systems. In the DECAF optimization, these types also correspond to application language types defined in a programming language, for example, C++, which is described in Bjame Stroustrup, The C++ Programming Language, Addison-Wesley Publishing Co., 1987, which is incorporated by reference herein. The following are examples of view types over row types:

```
type VTEmp (this db2emptable):
    (no integer,
    name character,
    salary integer,
    age integer,
    did integer,
    primary key (no)) as
(
select e.eno,
    e.ename,
    e.esal,
    e.eage,
    e.edid
```

-continued
```
        from this e
        )
        type VTDept (this db2depttable):
                (no integer,
                name character,
                floor integer,
                primary key (no)) as
        (
        select d.dno,
                d.dname,
                d.dfloor
        from this d
        )
```

View type "VTEmp" is based on a row type of "db2emptable", which was defined above. The view type "VTemp" accepts row type "db2emptable" as a parameter. Additionally, the view type "VTemp" has five attributes and a primary key. The five attributes are "no", "name", "salary", "age", and "did", which correspond to the columns in row type "db2emptable". The primary key is "no". The "select" statement selects columns from a collection of type "db2emptable".

View type "VTDept" is based on a row type of "db2depttable", which was defined above. The view type "VTDept" accepts row type "db2depttable" as a parameter. View type "VTDept" has three attributes and a primary key. The three attributes, "no", "name", and "floor", and the primary key "no", correspond to the columns and primary key, respectively, of the row type "db2depttable". The "select" statement selects columns from a collection of type "db2depttable".

Collections can be defined that are based on a view type. The following examples are view collections (i.e., object representations of tables) over relational tables.

collection VEmp on VTEmp (db2emp)
   collection VDept on VTDept (db2dept)

For example, collection "VEmp", is of view type "VTEmp", which is derived from a collection based on row type db2emptable. Collection "VEmp" uses an alias "db2emp", which is a relational table. Similarly, collection "VDept", is of view type "VTDept", is derived from a collection based on row type db2depttable. Collection "VDept" uses an alias "db2dept", which is a relational table. The collections present an object-oriented view of relational tables.

Application types (e.g., classes in C++) can be generated that correspond to the view types described above. Application types, along with their implementation, can be automatically generated by a tool which guarantees their correspondence with their OO-SQL view type counterparts. The following example is of a C++ rendering of employee department data objects:

```
        class VTEmp {
            private:
            db2emptable *e;
            public:
            VTEmp (db2emptable*eparm) {e = eparm;}
            int get_no () {return (e->atts [0]);}
            char*get_name () {return (e->atts [1]);}
            int get_sal () {return (e->atts [2]);}
            int get_age () {return (e->atts [3]);}
            int get_did () {return (e->atts [4]);}
        }
```

-continued
```
        class VTDept {
            private:
            db2depttable*d;
            public:
            VTDept (db2depttable*dparm) {d = dparm;}
            int get_no () {return (d->atts [0]);}
            char*get_name () {return (d->atts [1]);}
            int get_floor () {return (d->atts [2]);}
        }
```

Class "VTEmp" contains C++ methods to operate on data in table "e". The C++ methods defined are get_no ( ), get_name ( ), get_sal ( ), get_age ( ), and get_did ( ).

Class "VTDept" contains C++ methods to operate on data in table "d". The C++ methods defined are get_no ( ), get_name ( ), and get_floor ( ).

Objects of view types can be retrieved as instances of application objects (e.g., an object can be instantiated based on a class defined in C++). For example, the following query returns instances of view type "VTEmp" contained in the view collection "VEmp" with salaries greater than 10:

select e from VEmp e where e.sal>10

An application type defined in, for example, C++ corresponds to view type "VTEmp". In evaluating the above query, which requires object building, the type constructor for "VTEmp" will be called with a handle on a row of a table identified by the correlation variable "e". The schema of the underlying row object is given by the alias. In the above example, a row object for "e" has columns "no", "name", "salary", "age" and "did".

3. Query Optimization with Deferred Updates and Autonomous Sources

The DECAF optimization is a query optimization technique for an object query system with an object cache supporting deferred updates to underlying databases. The DECAF optimization allows updates to the databases while data in the object cache is being modified (i.e., updates performed by transactions other than the transaction using the object cache at a given time). For data integrity, query results that are returned to a client application must include committed updates made by other transactions. Query results must also be consistent with any deferred updates that exist only in the object cache.

The DECAF optimization is organized into three steps. In the first step, the DECAF optimization rewrites queries so that in-cache deferred updates are taken into consideration in determining a query's result. In the second step, the DECAF optimization detects objects that have been deleted in the database or no longer qualify for a query's result due to a database update, but were preserved in the cache beyond some transaction boundary. The second step is only used in environments in which the object cache is maintained past transaction boundaries (i.e., where the contents of the object cache are preserved after the application using the object cache commits). Additionally, in the second step, the DECAF optimization transforms the query having an object view into a query that the RDBMS will understand. In the third step, the DECAF optimization translates the pushdown queries into SQL against the underlying tables and rewrites groups of two or more SQL queries destined for the same source table into a single query.

The DECAF optimization uses query pushdown to exploit the query processing capabilities of underlying systems and to reduce data transfer. First, a set of illustrative examples are presented to highlight the behavior of the DECAF optimization. Then, the general technique of the DECAF optimization is presented.

3.1 Queries with Simple Predicates

OO-SQL queries, which are described in Kiernan et al., that involve at most a single table are referred to as queries with simple predicates. These include queries with scalar comparisons, range testing, null testing, and like testing. For example, the following simple query retrieves employee numbers for employees having a salary greater than 50,000.

select e.no from VEmp e where e.salary>50000

Since the object cache can contain employees belonging to the VEmp collection with updated salaries, the query cannot be resolved by simply querying the underlying database alone. The DECAF optimization will process this query as shown below:

1. The DECAF optimization rewrites the query as follows:

cache VEmp as select e from VEmp e where e.salary>50000 select e'.no from cache (VEmp) e' where e'.salary>50000

The DECAF optimization thus transforms the query into two subqueries. The first subquery references the database content of the VEmp collection. The first subquery retrieves data (i.e., a result) into the object cache as indicated by the "cache VEmp as" clause. The "select e from Vemp e" statement identifies the data to be retrieved into the object cache from the RDBMS. The result will be added to the object cache content of collection VEmp. The DECAF optimization uses a "select e" statement because objects of type VTEmp, which are referenced by the correlation "e", are retrieved into the object cache.

The second subquery refers to the resulting object cache content of collection VEmp. The DECAF optimization uses the cache function in the "from cache" clause of the second subquery to indicate the object cache content of a collection.

The first subquery is run against the database, while the second subquery is run against the object cache, as will be discussed in steps 2 and 3 below.

2. The DECAF optimization modifies the query having an object view into a query that the RDBMS will understand. The DECAF optimization submits the following SQL query to the underlying database, filtering the results to include those employees in the database who have a salary greater than 50,000. This query results from query rewrite transformations being applied to the first subquery in step 1 above.

select e.no, e.name, e.esal, e.eage, e.edid from db2emp e where e.esal>50000

There could exist an updated employee u1 whose salary was previously 60,000 but reduced to 40,000 by an update not yet propagated to the database. Conversely, there might exist another updated employee u2 whose salary was previously 40,000 but augmented to 60,000 by another update not yet propagated to the database. Employee u1 is selected by the query over the database, and employee u2 isn't. By itself, this query thus presents an incorrect interpretation of the user's query with respect to the unpropagated updates on employees u1 and u2. Although not selected by the query to the database, employee u2 is present in the object cache, and the object representing u2 has the updated salary value. Employee u1 is selected by the query in step 2, but since u1 is also in the object cache at the time of the query, the object cache copy will be preserved, overriding the database value and, thereby, also preserving the cached updated salary value.

3. The DECAF optimization runs the second subquery from step 1 above, "select e'.no from cache VEmp e' where e'.salary>50000", against the cache content of the VEmp collection (i.e., which is a collection of objects in the object cache). At this time, the object cache contains a superset of the desired result set. The second subquery filters out u1 (as well as other non-qualifying cached employees) and includes u2 in the result, and is consistent with the database and with application updates at the time the query is issued. Inserted and deleted employees are handled similarly.

3.2 Join Queries

OO-SQL queries, which are described in Kiernan et al., that have simple predicates and involve one or more tables, are referred to as queries with join predicates. The relationships among tables are established with predicates that are join expressions. These include queries with scalar comparisons, range testing, null testing, and like testing. For example, the following join query selects employees over 40 who work in departments that are on the fourth floor.

select e.no from VEmp e, VDept d where e.age>40 and e.did=d.no and d.floor=4

The above query is actually a semi-join because no element of "d" appears in the projection list. Aside from insertions and deletions, three types of deferred updates can affect this query's result: an employee's age may have been updated, an employee may have changed departments, and a department may have moved from one floor to another. The DECAF optimization transforms and correctly resolves the query as follows:

1. The DECAF optimization rewrites the query as follows:

cache VEmp as select e from VEmp e where e.age>40 cache VDept as select d from VDept d where d.floor=4 and d.no in (select e'.did from cache (VEmp) e')

select e'.no from cache (VEmp) e', cache (VDept) d' where e'.age>40 and e'.did=d'.no and d'.floor=4

The DECAF optimization transforms the query into three subqueries. The first subquery is used to retrieve employee data from the database into the object cache. The second subquery is used to retrieved department data from the database into the object cache. The third subquery is run against the object cache to obtain the response to the original query.

2. The DECAF optimization submits the following two separate SQL queries to the RDBMS, where the two SQL queries below correspond to the first and second subqueries from step 1:

select e.*from db2emp e where e.age>40 select d.*from db2dept d where d.dfloor=4 and d.no in (V1, V2, . . . , Vn)

The (V1, V2, . . . , Vn) clause corresponds to the resulting cache occurrences of e'.did. The "select e'.did from cache (VEmp) e'" clause in the second subquery of step 1 is an optimization which corresponds to introducing the predicate d.no in (V1, V2, . . . , Vn) and which is applied to restrict the result of the second query to include only those departments on the fourth floor that will actually join with employees in the cache. In general, this optimization is only performed by the DECAF optimization if there exists another simple predicate on the joining quantifier, and, in this example, e.age>40 is such a predicate.

The DECAF optimization takes advantage of predicates that involve a single quantifier to restrict the number of results extracted from the relational database.

3. The DECAF optimization then evaluates the third subquery from step 1 above against the object cache:

select e'.no from cache (VEmp) e', cache (VDept) d'
where e'.age>40 and e'.did=d'.no and d'.floor=4

Deferred updates that reflect employees changing departments are taken into consideration by the final in-cache join, as employees having new "age" values are present in the cache. The in-cache evaluation of the query takes these new values into consideration. Deferred updates to department floors are present in the cache and are handled similarly. Insertions and deletions are also handled similarly.

FIG. 3 is a flow diagram illustrating the basic steps performed by the DECAF optimization. In Block 300, the DECAF optimization transforms an object-oriented query into subqueries. At least one subquery is directed against a database, and one subquery is directed against an object cache. In Block 302, the DECAF optimization executes each subquery directed against the database to retrieve data from the database into the object cache. In Block 304, the DECAF optimization executes the subquery that is directed against the object cache to retrieve data for the query. The data that is retrieved incorporates updates to the object cache and the database.

4. Query Optimization Using a Multi-Layered Object Cache

Figure 4:
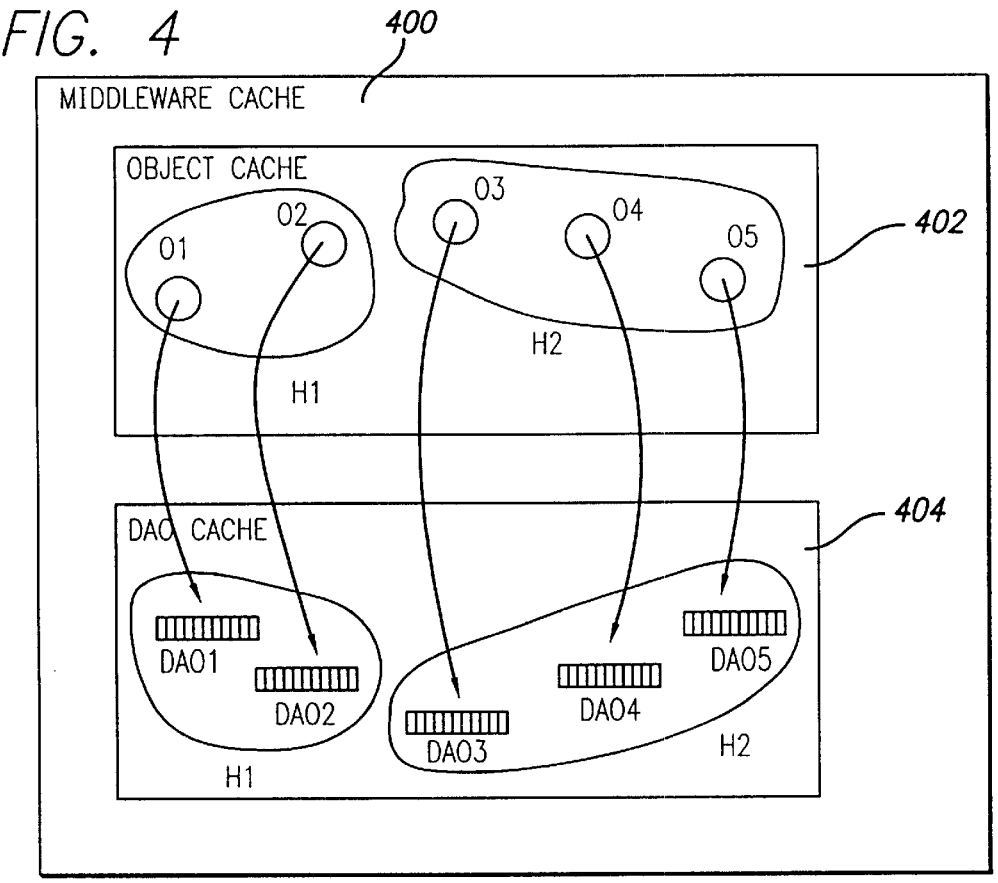
FIG. 4 is a diagram illustrating a multi-layer cache organization that may be used for the present invention in accordance with a preferred embodiment.

In the present invention, DECAF+, the multi-layered caching environment in which the optimization is used is presented in FIG. 4, which presents a more detailed view of the caching organization given in FIG. 1. The middleware cache 400 has an object cache 402 which contains a total of five objects $O_1, O_2, \ldots, O_5$. Objects $O_1$ and $O_2$ belong to home collection $H_1$ and objects $O_3$, $O_4$ and $O_5$ belong to home collection $H_2$. Each object in the object cache 402 is an application object (also called a business object) which contains part of the application logic common to most applications in the application's domain. The application logic is implemented as methods on the business objects. The business objects in turn derive their data from DAO objects contained in the DAO cache 404.

In FIG. 4 there is a one-to-one correspondence between a business object in the object cache 402 and its supporting data object in the DAO cache 404. However, the correspondence need not necessarily be one-to-one. Similarly to the object cache 402, the DAO cache 404 also groups objects into the home collections in which they belong. In FIG. 4, DAO objects DAO1 and DAO2 belong to home collection $H_1$ and DAO objects DAO3, DAO4 and DAO5 belong to home collection $H_2$.

4.1 Query Optimization Using DECAF+

FIG. 5 presents the DECAF+ query processing steps, which can be described as follows. Methods in queries can only be evaluated against AOs, since they are defined at that level and not at the DAO level. It is thus necessary to create AOs using their corresponding DAOs in order to run these methods. The creation of AOs for this purpose is called "upcalls".

1. Rewrite the user's query, in block 502, into an equivalent query against DAOs, which may include AO-level upcalls if necessary. As a side-effect of this transformation, path expressions that strictly reference mapped attributes are rewritten into joins (i.e., evaluating the path expression doesn't require evaluating methods). This is discussed in greater detail in Section 4.1.1.

2. Apply the DECAF algorithm, in block 504, against the rewritten query over DAOs. Note that the DECAF algorithm operates on collections of AOs referenced in the user's query. In contrast, in DECAF+, the DECAF transformations are applied on collections of DAOs resulting from the transformations of Item 1. This is possible due to the multi-level organization of the cache.

3. If the query's predicate has multiple conjuncts, re-order, in block 506, the conjuncts associated with the rewritten query of Item 1, such that conjuncts which only involve mapped attributes appear before conjuncts which reference AO methods. This is done to ensure that predicates over mapped attributes are evaluated before predicates over methods, since method predicates involve potentially costly AO upcalls.

Following are several examples of DECAF+ use, applied to the examples presented in the previous section. The query retrieves employees having a salary greater than 50,000.

select e.no from VEmp e where e.salary>50000

Before applying the DECAF algorithm, the DECAF+ optimization is applied and the query is rewritten as follows:

select e.eno from db2emp e where e.esal>50000

The DECAF algorithm's query pushdown transformations are then applied to this rewritten query as follows:

DAO cache db2emp as
select db2emptable (e.eno, e.ename, e.esal, e.eage, e.edid)
from db2emp e where e.esal>50000
select e'.eno from DAO cache (db2emp) e'
where e'.esal>50000

The first query retrieves database rows into the DAO cache 404. The select list consists of a call to the "db2emptable" constructor to build a cache record from the fields in each selected database record. Each cache object is inserted, if it is not already in the cache, into the set of cached objects associated with the db2emp collection. The second query is then run against the set of cached objects associated with the db2emp collection.

In comparison with the DECAF transformations described in the previous section, the transformations presented in this section allow a query to be executed against the DAO cache 404 (i.e., the cache of database records). Since all attributes in the query are mapped attributes, no methods appear in the transformed queries and the query can be resolved strictly against DAO attributes (i.e., database record fields). The transformed query properly reflects all updates, since the DAO records will contain any deferred updates which have been applied by the application and delegated from the business objects onto the cache records.

In another example, the objects in collection VEmp have a method called "earned_vacation", which computes the number of vacation days allotted to an employee. A query that retrieves employees having a salary greater than 50000 and a number of vacation days greater than 10 is:

select e.no from VEmp e
where e.salary>50000 and e.earned_vacation( )>10

Before applying the DECAF algorithm, the query is first rewritten by DECAF+ as follows (i.e., the query over AOs is rewritten into an equivalent query over DAOs):

select e.eno from db2emp e
where e.esal>50000 and (AOCache (VEmp, VTEmp, e))->eamed_vacation( )>10

The predicate "e.eamed_vacation( )>10" cannot be pushed down to the database, nor can it be evaluated against the DAO cache 404, since the method is defined at the application (business) object (AO) level. A reference to the AO object associated with a DAO cache 404 entry is acquired using an AO object cache 402 lookup operation called AOCache. Note that if the object is not found during the lookup operation, it is created and added to the cache as part of the operation. AOCache accepts as parameters a cache collection name (e.g., VEmp), which is the scope of the lookup operation, a cache collection type (e.g., VTEmp) denoting the type of objects contained in the collection, and a reference to a DAO-level object (e.g.,., e) and returns a reference to a AO-level cached object as the result of the operation. The "earned_vacation" method can then be run against the AO object reference to evaluate the predicate. Applying the DECAF algorithm then results in the following transformation:

DAO cache db2emp as select db2emptable (e.eno, e.ename, e.esal, e.eage, e.edid)

from db2emp e where e.esal>50000 select e'.eno from DAO cache (db2emp) e' where e'.esal>50000 and (AOCache (VEinp, VTEmp, e')->earned_vacation( )>10

4.1.1. Optimizing Queries with Path Expressions Using DECAF+

DECAF+ can decompose queries with path expression into equivalent queries with join expressions, which DECAF cannot do since the foreign key attributes required for the join transformation are not in any AO's signature. The query given in the previous section is a join query that selects employees over 40, who work in departments that are on the fourth floor.

select e.no from VEmp e, VDept d where e.age>40 and e.did=d.no and d.floor=4

In this example instead of having an attribute did, VTEmp has an attribute dept, which is a reference to an object of type VTDept. The view type given in the previous section can be redefined as follows.

type VTEmp (this db2emptable):

(no integer, name character, salary integer, age integer, dept VTDept*, primary key (no)) as ( select e.eno, e.ename, e.esal, e.eage, (select VTDept(d) from db2dept d where d.dno=e.edid)

from this e)

A subquery is being used here to derive a reference to an employee's department using a join expression. VTDept accepts a reference to an object of type db2depttable (i.e., d in the above example) and returns a reference to the corresponding VTDept object. The query of the previous section can then be expressed using a path expression as follows:

select e.no from VEmp e where e.age>40 and e.dept. floor=4

DECAF cannot convert the expression "e.dept..floor" into a join expression, since the foreign key attribute "did" has now been replaced by a reference attribute "dept" in the AO's signature. The DECAF algorithm would therefore retrieve the set of employees corresponding to correlation e as objects into the cache, and then it would evaluate the path expression in memory. Evaluating the path expression in memory would result in fetching departments from the database individually, using an employee's department as key and a "find-by-key" look-up operation. Furthermore, each attribute in the path would be evaluated as a method in this case.

DECAF+handles this type of query more efficiently by decomposing it into an equivalent query against DAOs as follows:

select e.eno from db2emp e, db2dept d where e.eage>40 and d.dfloor=4 and e.edid=d.dno After applying DECAF+, applying DECAF further transforms the query into the following:

DAO cache db2emp as select db2emptable (e.eno, e.ename, e.esal, e.eage, e.edid)

from db2emp e where e.eage>40

DAO cache db2dept as select db2depttable (d.dno, d.dname, d.dfloor)

from db2dept d where d.dfloor=4 and d.dno in (select e'. edid from DAO cache (db2emp) e')

select e'.eno from DAO cache (db2emp) e', DAO cache (db2dept) d' where e'. eage>40 and d'. dfloor=4 and e'. edid=d'. dno

The newly generated query for quantifier d has an additional predicate d.dno in (select e'.edid from DAO cache (db2emp) e'), which restricts departments to those which will match with instances retrieved by the newly generated query for quantifier e.

It should be noted that aside from pushing down the predicate "e.age>40", DECAF+ allows pushing down the predicate "d.floor=4" to the underlying database. Furthermore, the path expression is now represented as a join expression against DAOs instead of a path expression on AOs, which needs to be evaluated with methods. This results in a significant performance improvement for queries with path expressions.

4.1.2 Query Optimization Using Inserted and Updated Sets

Another optimization achieved using the DAO cache 404 involves being able to use the set of inserted and updated objects associated with a home collection, instead of the set of all in-cache objects associated with the home collection.

Figure 6:
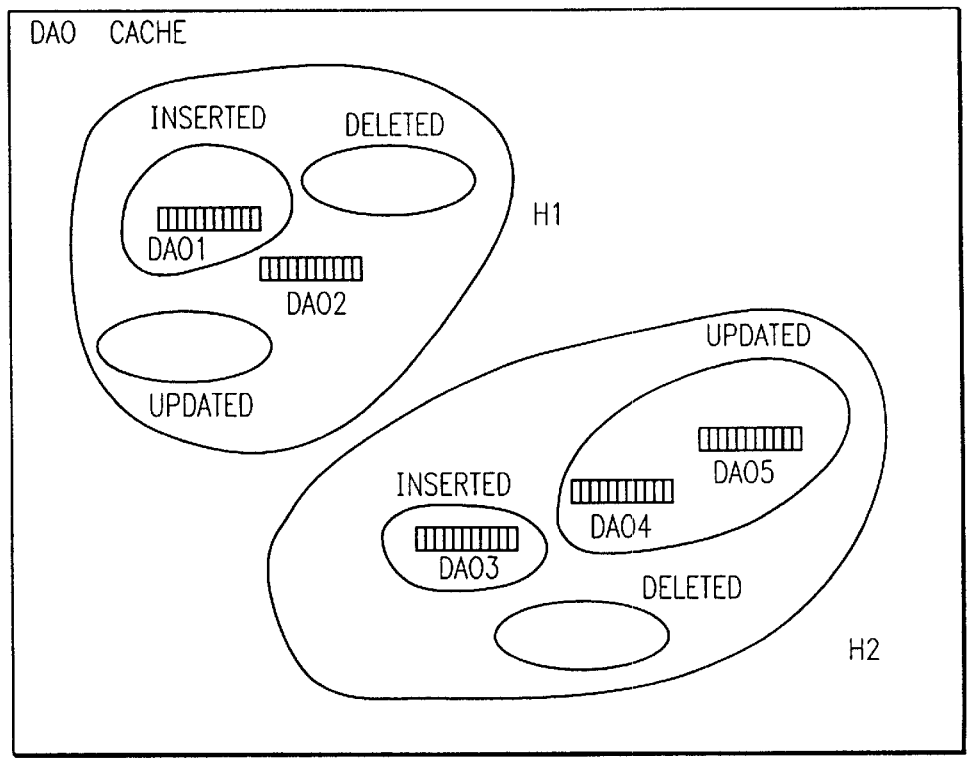
FIG. 6 is a diagram illustrating a DAO cache organization that may be used for the present invention in accordance with a preferred embodiment.

In the DAO cache 404, aside from being able to access all of the DAO objects associated with a home collection, it is also possible to access certain subsets of the DAO objects in a home collection. These subsets are, for a given transaction, the list of inserted DAO objects, the list of deleted DAO objects and the list of updated DAO objects. These subsets are disjoint and are illustrated in FIG. 6.

Collection $H_1$ has one inserted object, DAO1, which has been inserted into the cache but not into the database yet; it has another object, DAO2, which has been retrieved from the database into the cache. Collection $H_1$ has no deleted or updated objects associated with it. Collection $H_2$ has one inserted object, DAO3, and two updated DAO objects DAO4 and DAO5; the updates have been applied to the objects in the cache but the updates have not yet been propagated back to the database. Collection $H_2$ has no deleted objects associated with it.

More formally, for a given transaction, the set of inserted cache objects can be defined, associated with a collection H, as those objects that have been created in collection H but have not yet been inserted into the database. For a given transaction, the set of updated objects can be defined, associated with a collection H, as those objects in H which have been modified by the application but which have not yet been updated in the database.

For a given transaction, the set of deleted objects can be defined, associated with a collection H, as those objects which have been deleted in H but which have not yet been dropped from the database. Note that deleted objects remain in the cache but are tagged as such. For a given transaction, the set of cached objects can be defined, associated with a collection H, as those objects that have either been retrieved from the database into the cache or else inserted into (i.e., created in) the cache. H does not include objects that have been deleted in the cache.

The DECAF algorithm was designed to iterate over the full set of in-cache objects associated with a home collection. As the number of objects in the cache grows during a transaction, the cost of evaluating a query also increases due to the fact that the query is to be evaluated against all of the objects in the cache. The DAO cache 404 offers iterators over the entire set of in-cache objects associated with a home collection, in addition to the sets of inserted, deleted, and updated objects associated with a home collection. Using the inserted and updated sets can further optimize query evaluation such that query performance is not adversely affected by the overall cache size.

In the modification to the DECAF algorithm, in DECAF+, the sets of DAO objects extracted from the backend database are kept in temporary sets during query evaluation, as well as being added to the pool of in-cache objects. Then, instead of evaluating the query against the full in-memory set of cached objects, the set of inserted and updated DAO objects is added to the set of DAO objects retrieved by the query from the backend database. This is done for each home collection (or DAO set) participating in the query. The query is then evaluated against these temporary sets.

DAO objects that are already present in the cache when they are retrieved from the backend databases are substituted in the result set, so the cached copy of each cached object is used instead of the (possibly outdated) database copy. Deleted objects in the cache that are retrieved from the backend database are also detected and removed from the result set when forming the set of extracted DAO objects from the database. The only other set of objects possibly qualifying for the query belong to the set of inserted and updated DAO objects which were not propagated to the database. These sets are added to the temporary set of DAO objects retrieved from the backend database.

For example, the query given in the previous section selects employees having a salary greater than 50,000. The transformations to the query applied by DECAF+ produce the following output:

DAO cache db2emp as
select db2emptable (e.eno, e.ename, e.esal, e.eage, e.edid)
from db2emp e where e.esal>50000
select e'.eno from DAO cache (db2emp) e'
where e'.esal>50000

Instead of using the full set of cached objects associates with db2emp (i.e., DAO cache (db2emp)), we can use the inserted and updated set as follows:

DAO cache db2emp into s1 as
select db2emptable (e.eno, e.ename, e.esal, e.eage, e.edid)
from db2emp e where e.esal>50000
Append inserted DAO cache (db2emp) to s1
Append updated DAO cache (db2emp) to s1
select e'.eno from s1 e'
where e'. esal>50000

The first statement inserts its result both into the DAO cache 404 associated with the db2emp collection and into temporary collection s1. Then, the sets of inserted and updated cache objects associated with the db2emp collection are appended to collection s1. Finally, the query is evaluated against collection s1 instead of against the full collection of in-cache objects associated with collection db2emp.

This optimization can only be applied to home collections where the cache consistency model is repeatable read. The reason for this is that if the consistency model for a home collection is optimistic locking, there might be some DAO objects that were read into the cache by a previous query that were subsequently updated in the database by a separate transaction before the current query began executing. The update might exclude the object from the backend query's result, whereas the object in the cache would qualify for the query result.

5. Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention while the DECAF+ optimization has been presented in terms of view definition language, the invention presented in this disclosure is applicable to similar views over any data model that supports a cache with similar deferred updates.

In summary, the present invention discloses a method, apparatus, and article of manufacture for a computer-implemented DECAF+ optimization. The invention presented in this disclosure reduces the cost of running queries in an object middleware system which supports object views of heterogenous data and in which updates applied against the object cache can be deferred until some point such as the end of the transaction. This invention, called DECAF+, is an enhancement to a previous algorithm called DECAF. DECAF+ exploits the multi-layered structure of the cache. DECAF+'s performance enhancements over DECAF are achieved by running queries against lower cache layers which have better performance characteristics than the external or upper layers. DECAF+ also allows optimizing queries with path expressions by transforming path expression into joins. DECAF+ works by reducing the user's query to an equivalent query against cached data objects (vs. cached business objects used by DECAF) and then applies the DECAF algorithm at that level. Another performance optimization, using inserted sets, is presented which allows DECAF+ to evaluate queries against a subset of a collection of cached objects instead of an entire collection of cached objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing an object-oriented query in a multi-layered cache having an application objects (AOs)

cache and a data access objects (DAOs) cache, the method retrieving data from a database stored on a data storage device connected to a computer and comprising the steps of:

rewriting the query into a query directed against the DAOs cache;

applying a pushdown transformation algorithm to the rewritten query directed against the DAOs cache; and executing the transformed query against the DAOs cache.

2. The method of claim 1, wherein the application objects include methods deriving data from DAOs, and wherein the rewritten query comprises a predicate having multiple conjuncts, further comprising the step of re-ordering the conjuncts, whereby the conjuncts only involving mapped attributes appearing before the conjuncts referencing the methods, and being evaluated before the conjuncts referencing the methods.

3. The method of claim 1, wherein the application objects include methods deriving data from DAOs, and wherein the step of rewriting the query into a query directed against the DAOs cache further comprising the steps of:

creating application object upcalls for the methods from the corresponding DAOs, using an AOs cache lookup operation, wherein if the AOs cache lookup operation not finding a corresponding application object for a data access object (DAO), creating the application object and adding it to the AOs cache; and running the method against the application object from the AOs cache.

4. The method of claim 1, wherein the query having a path expression referencing mapped attributes, the step of rewriting the query against the DAOs cache further comprises the step of rewriting the query having a path expression into a query having a join, directed against the DAOs cache.

5. The method of claim 1, wherein the step of applying a pushdown transformation algorithm to the rewritten query further comprises the step of executing a query directed against the database to retrieve data from the database into the DAOs cache.

6. The method of claim 1, wherein the step of executing the transformed query against the DAOs cache only using a subset of DAOs inserted into and updated in the DAOs cache and objects retrieved from the database during the query execution.

7. An apparatus for executing an object-oriented query, comprising:

a computer having a data storage device connected thereto, wherein the data storage device stores a database;

a multi-layered cache having an application objects (AOs) cache and a data access objects (DAOs) cache; and one or more computer programs, performed by the computer, for executing the object-oriented query in the multi-layered cache by rewriting the query into a query directed against the DAOs cache, applying a pushdown transformation algorithm to the rewritten query directed against the DAOs cache, and executing the transformed query against the DAOs cache.

8. The apparatus of claim 7, wherein the application objects include methods deriving data from DAOs, and wherein the rewritten query comprises a predicate having multiple conjuncts, further comprising the means for re-ordering the conjuncts, whereby the conjuncts only involving mapped attributes appearing before the conjuncts referencing the methods, and being evaluated before the conjuncts referencing the methods.

9. The apparatus of claim 7, wherein the application objects include methods deriving data from DAOs, and wherein the program for rewriting the query into a query directed against the DAOs cache further comprising the means for:

creating application object upcalls for the methods from the corresponding DAOs, using an AOs cache lookup operation, wherein if the AOs cache lookup operation not finding a corresponding application object for a data access object (DAO), creating the application object and adding it to the AOs cache; and running the method against the application object from the AOs cache.

10. The apparatus of claim 7, wherein the query having a path expression referencing mapped attributes, the program for rewriting the query against the DAOs cache further comprises the means for rewriting the query having a path expression into a query having a join, directed against the DAOs cache.

11. The apparatus of claim 7, wherein the program for applying a pushdown transformation algorithm to the rewritten query further comprises the means of executing a query directed against the database to retrieve data from the database into the DAOs cache.

12. The apparatus of claim 7, wherein the program for executing the transformed query against the DAOs cache only using a subset of DAOs inserted into and updated in the DAOs cache and objects retrieved from the database during the query execution.

13. An article of manufacture comprising a computer program carrier readable by a computer and embodying one or more instructions executable by the computer to perform method steps for executing an object-oriented query in a multi-layered cache having an application objects (AOs) cache and a data access objects (DAOS) cache, the method retrieving data from a database stored on a data storage device connected to the computer and comprising the steps of:

rewriting the query into a query directed against the DAOs cache;

applying a pushdown transformation algorithm to the rewritten query directed against the DAOs cache; and executing the transformed query against the DAOs cache.

14. The article of manufacture of claim 13, wherein the application objects include methods deriving data from DAOs, and wherein the rewritten query comprises a predicate having multiple conjuncts, further comprising the step of re-ordering the conjuncts, whereby the conjuncts only involving mapped attributes appearing before the conjuncts referencing the methods, and being evaluated before the conjuncts referencing the methods.

15. The article of manufacture of claim 13, wherein the application objects include methods deriving data from DAOs, and wherein the step of rewriting the query into a query directed against the DAOs cache further comprising the steps of:

creating application object upcalls for the methods from the corresponding DAOs, using an AOs cache lookup operation, wherein if the AOs cache lookup operation not finding a corresponding application object for a data access object (DAO), creating the application object and adding it to the AOs cache; and running the method against the application object from the AOs cache.

16. The article of manufacture of claim 13, wherein the query having a path expression referencing mapped attributes, the step of rewriting the query against the DAOs cache further comprises the step of rewriting the query having a path expression into a query having a join, directed against the DAOs cache.

17. The article of manufacture of claim 13, wherein the step of applying a pushdown transformation algorithm to the rewritten query further comprises the step of executing a query directed against the database to retrieve data from the database into the DAOs cache.

18. The article of manufacture of claim 13, wherein the step of executing the transformed query against the DAOs cache only using a subset of DAOs inserted into and updated in the DAOs cache and objects retrieved from the database during the query execution.

* * * * *